United States Patent Office 3,475,540
Patented Oct. 28, 1969

3,475,540
SYNERGISTIC ANTIMICROBIAL COMPOSITIONS
Fred S. Barr, Bristol, Va., and Galen F. Collins, Bristol, Tenn., assignors to The S. E. Massengill Company, Bristol, Tenn.
No Drawing. Continuation-in-part of application Ser. No. 306,716, Sept. 5, 1963. This application Sept. 20, 1967, Ser. No. 669,251
Int. Cl. A01n 9/02, 9/38
U.S. Cl. 424—291                                    5 Claims

ABSTRACT OF THE DISCLOSURE

This invention relates to combinations of antimicrobial agents from each of two groups, one group being antimicrobial organic-mercuric salts, and the second group being selected from the class of phenolic antimicrobial agents and 3,4,4'-trichlorocarbanilide, bromosalicylanilides such as "Diaphene" which is a mixture of 5,4'-dibromosalicylanilide and 3,5,4'-tribromosalicylanilide and fluorosalicylanilides such as 5,4'-difluorosalicylanilide and 3,5,4'-trifluorosalicylanilide which are sold under the trade name "Fluorophene." The combination of an effective amount of each of these classes of antimicrobial agents provides a composition which is more effective as an antimicrobial agent than the additive effect of the two antimicrobial agents.

Cross reference to related application

This application is a continuation-in-part of our copending application Ser. No. 306,716, filed Sept. 5, 1963, for "Antimicrobial Compositions, now abandoned."

Background of the invention

Attempts have been and are constantly being made to increase the antimicrobial action of antimicrobial agents. One method which has been used for this purpose is to mix known antimicrobial agents in the hope that the resulting composition will be more effective than the individual agents. In most cases, the best that can be hoped for is an additive effect of the two ingredients, that is a total effect which is no more than the sum effect of each of the ingredients. Thus, for example, assuming that agent A inhibits the growth of a particular microorganism in a dilution of 1:100,000 and agent B is effective in the same dilution, namely 1:100,000, then an additive effect would mean that a mixture of A and B would be effective in a dilution of 1:200,000. A synergistic effect would mean that the mixture is effective in a dilution greater than 1:200,000, e.g. 1:250,000.

However, synergistic effects are rarely achieved, and in many cases what is actually achieved is even less than the additive effect of the two ingredients. Thus, using the same example, very often the mixture of the two ingredients would be effective in a dilution of 1:150,000, or even 1:100,000, which is of course less than the additive effect of the ingredients. As a matter of fact, in many cases a total diminished effect is achieved so that a mixture of A and B could result in the minimum inhibitory concentration actually being reduced, e.g. 1:50,000.

From the above background discussion it will be apparent that the mixing of antimicrobial agents in order to try to improve the action thereof generally does not achieve the desired result.

Summary of the invention

Generally speaking, the present invention, mainly comprises an antimicrobial composition comprising, as coactive ingredients, an effective amount of an organic mercuric salt which itself has an antimicrobial action plus an effective amount of an antimicrobial agent selected from the group consisting of phenolic antimicrobial agents, 3,4,4' - trichlorocarbanilide, bromosalicylanilides and fluorosalicylanilides.

It is accordingly a primary object of the present invention to provide new antimicrobial compositions which are highly effective against many types of microorganisms.

It is another object of the present invention to provide new antimicrobial compositions in which the normal antimicrobial activity of certain known antimicrobial agents is so greatly potentiated that lesser amounts of the agents can be used to achieve both bacteriastatic and bactericidal action.

It is yet another object of the present invention to provide antimicrobial compositions that can be used for various antimicrobial purposes; for example, in the form of antiseptic solutions and shampoos for cleaning purposes, for pre-surgical scrub-up, for physicians, for pre-operative treatment of the skin, for dermatological conditions, and for prophylaxis in general.

Other objects and advantages of the present invention will be apparent from a further reading of the specification and of the appended claims.

It has been found that organic-mercuric salts, and particularly phenylmercuric and chloromethoxypropylmercuric acetates, nitrates and borates, and nitromersol, which themselves are effective antimicrobial agents, have the unexpected property of greatly potentiating the activity of known phenolic antimicrobial agents, and particularly bithionol, which is generally used in the form of sodium bithionol or sodium bithionolate (the chemical name being disodium 2,2'-thiobis-(4,6-dichlorophenol)), hexachlorophene, resorcinol, dichlorophene (2,2'-methylene-bis-(4-chlorophenol)), parachlorometacresol, 2-N-hexyl-4-chlorophenol, p-N-heptylphenol, and 4-N-hexylresorcinol as well as of 3,4,4'-trichlorocarbanilide, bromosalicylanilides such as 5,4'-dibromosalicylanilide and 3,5,4'-tribromosalicylanilide and fluorosalicylanilides such as 5,4'-difluorosalicylanilide and 3,5,4'-trifluorosalicylanilide.

Actually, it cannot be stated whether the organic-mercuric salt potentiates the activity of the phenolic antimicrobial agent, or whether the phenolic antimicrobial agent potentiates the activity of the organic-mercuric salt. The fact is that when these two types of agents are used together, in combination, in accordance with the present invention, the amount of each of the agents in the combination which is necessary in order to achieve either an inhibitory action against the microorganism or a killing action of the microorganism is tremendously decreased so that much less of each of the agents in the combination, and much less total antimicrobial agent, is necessary in order to achieve the desired antimicrobial effect.

Thus, for example, the minimum inhibitory concentration of phenylmercuric acetate against *S. aureus* is 1:600,000 and the minimum inhibitory concentration of hexachlorophene against the same microorganism is 1:100,000. However, when a mixture of one part of phenylmercuric acetate and ten parts of hexachlorophene is used together, the minimum inhibitory concentration of the mixture is 1:10,000,000 so that in the mixture the minimum inhibitory concentration of the phenylmercuric acetate is potentiated to 1:10,000,000 and of the hexachlorophene is potentiated to 1:1,000,000.

The greatly potentiated activity of the combinations of the present invention is illustrated in the tables below which show the greatly decreased minimum inhibitory concentrations and killing concentrations of the combinations of the present invention as compared to the individual components.

The following procedure was used in connection with the tests to determine the antimicrobial activity: The medium contained pancreatic digest of casein, 1.7 percent; dipotassium phosphate, 0.25 percent; dextrose, 0.25 percent. This was dissolved in distilled water and dispensed in 5 ml. amounts in metal capped culture tubes (150 x 18 mm). The test solutions were made up and serially diluted through this medium. The tubes were then sterilized at 121° C. for 15 minutes and cooled to room temperature. The test cultures were prepared by transferring the organism, from an agar slant to the above medium and incubating for 18 hours at 37° C. The cultures were centrifuged and washed with 0.9 percent saline twice. Following the final wash the cultures were resuspended in saline and diluted until there was 75 percent light transmission on the Spectronic 20 Colorimeter at a wavelength of 550 m$\mu$. The standardized culture was then used to inoculate the tubes of test solution. Exactly 0.1 ml. of the culture suspension was transferred to each tube of test solution in broth. The test organisms were *C. albicans* and *S. aureus*. Following inoculation of the solutions the tubes were incubated at 37° C. for 4 hours and observed for growth. The highest dilution tube showing no growth is reported as the minimum inhibitory concentration.

A similar procedure was used to determine the minimum, killing concentrations.

TABLE 1

| | Minimum Inhibitory Concentrations | |
|---|---|---|
| | S. aureus | C. albicans |
| Agent: | | |
| Chloromethoxypropylmercuric Acetate | 1:640,000 | 1:1,280,000 |
| Phenylmercuric Acetate | 1:600,000 | |
| Phenylmercuric Nitrate | 1:400,000 | |
| Bithionol | 1:100,000 | 1:20,000 |
| Hexachlorophene | 1:100,000 | 1:32,000 |

| | Minimum Inhibitory Concentrations of Mixtures | |
|---|---|---|
| Combinations: | | |
| Phenylmercuric Acetate, 1 Part / Hexachlorophene, 10 Parts | 1:10,000,000 | |
| Phenylmercuric Acetate, 1 Part / Bithionol, 10 Parts | 1:10,000,000 | |
| Phenylmercuric Nitrate, 1 Part / Bithionol, 10 Parts | 1:8,000,000 | |
| Chloromethoxypropylmercuric Acetate, 1 Part / Bithionol, 10 Parts | 1:5,120,000 | 1:2,560,000 |
| Chloromethoxypropylmercuric Acetate, 1 Part / Hexachlorophene, 10 Parts | 1:2,560,000 | 1:2,560,000 |

| | Killing Concentrations, S. aureus |
|---|---|
| Agent: | |
| Phenylmercuric Nitrate | 1:160,000 |
| Bithionol | 1:1,000 |

| | Killing Concentration of Mixture |
|---|---|
| Combination: | |
| Phenylmercuric Nitrate, 1 Part / Bithionol, 32 Parts | 1:640,000 |

In addition, using the same procedure, additional tests were carried out, and these tests are summarized below:

TABLE 2

| | Minimum Inhibitory Concentrations | |
|---|---|---|
| | S. aureus | C. albicans |
| Agent: | | |
| Phenylmercuric Acetate | 1:600,000 | 1:1,280,000 |
| Resorcinol | 1:800 | 1:200 |
| 3,4,4'-trichlorocarbanilide | 1:128,000 | |
| Diaphene* | 1:128,000 | 1:32,000 |
| Fluorophene** | 1:64,000 | 1:16,000 |

| | Minimum Inhibitory Concentrations of Mixtures | |
|---|---|---|
| Combinations: | | |
| Phenylmercuric Acetate, 1 Part / Resorcinol, 10 Parts | 1:2,480,000 | 1:2,480,000 |
| Phenylmercuric Acetate, 1 Part / 3,4,4'-trichlorocarbanilide, 10 Parts | 1:2,560,000 | |
| Phenylmercuric Acetate, 1 Part / Diaphene, 10 Parts | 1:5,120,000 | 1:5,120,000 |
| Phenylmercuric Acetate, 1 Part / Fluorophene, 10 Parts | 1:5,120,000 | 1:5,120,000 |

| | Minimum Inhibitory Concentrations, S. aureus |
|---|---|
| Agent: | |
| Phenylmercuric Borate | 1:640,000 |
| Diaphene | 1:128,000 |
| Fluorophene | 1:64,000 |
| Bithionol | 1:100,000 |

| | Minimum Inhibitory Concentrations of Mixtures |
|---|---|
| Combinations: | |
| Phenylmercuric Borate, 1 Part / Diaphene, 10 Parts | 1:2,560,000 |

| | Minimum Inhibitory Concentrations of Mixtures S. aureus |
|---|---|
| Combinations: | |
| Phenylmercuric Borate, 1 Part / Fluorophene, 10 Parts | 1:2,560,000 |
| Phenylmercuric Borate, 1 Part / Bithionol, 10 Parts | 1:5,120,000 |

| | Minimum Inhibitory Concentrations | |
|---|---|---|
| | S. aureus | C. albicans |
| Agent: | | |
| Nitromersol | 1:160,000 | 1:40,000 |
| Bithionol | 1:160,000 | 1:10,000 |
| Hexachlorophene | 1:160,000 | 1:20,000 |

| | Minimum Inhibitory Concentrations of Mixtures | |
|---|---|---|
| Combinations: | | |
| Nitromersol, 1 Part / Bithionol, 10 Parts | 1:3,200,000 | 1:200,000 |
| Nitromersol, 1 Part / Hexachlorophene, 10 Parts | 1:6,400,000 | 1:800,000 |

| | Minimum Inhibitory Concentrations | |
|---|---|---|
| | S. aureus | C. albicans |
| Agent: | | |
| Phenylmercuric Acetate | 1:600,000 | 1:1,280,000 |
| Bithionol | 1:100,000 | 1:20,000 |

| | Minimum Inhibitory Concentrations of Mixtures | |
|---|---|---|
| Combinations: | | |
| Phenylmercuric Acetate, 1 Part / Bithionol, 2 Parts | 1:10,000,000 | 1:6,400,000 |
| Phenylmercuric Acetate, 1 Part / Bithionol, 4 Parts | 1:10,000,000 | 1:6,400,000 |
| Phenylmercuric Acetate, 1 Part / Bithionol, 5 Parts | 1:10,000,000 | 1:6,400,000 |
| Phenylmercuric Acetate, 1 Part / Bithionol, 20 Parts | 1:5,120,000 | 1:5,120,000 |
| Phenylmercuric Acetate, 1 Part / Bithionol, 50 Parts | 1:6,400,000 | 1:6,400,000 |
| Phenylmercuric Acetate, 1 Part / Bithionol, 100 Parts | 1:12,000,000 | 1:1,600,000 |

*This is a mixture of 80% 3,5,4'-tribromosalicylanilide and 20% 5,4' dibromosalicylanilide.
**This is the Stecker Chemical Company product for the fluorine derivative of Diaphene.

The organic mercuric salt and the other antimicrobial agent can be used together in greatly varying proportions to achieve the potentiated antimicrobial effect of this invention. It is preferred that the phenolic antimicrobial agent or the 3,4,4'-trichlorocarbanilide or the bromosalicylanilide or the fluorosalicylanilide be present in an amount of about 2–200 parts per each part of the organic mercuric salt for inhibition of the microorganism. The preferred concentration is about 10 parts of the other above mentioned antimicrobial agent per each part of the mercuric salt. Actual potentiation is achieved through even wider ranges of proportions than those indicated. However, as a practical matter, and for reasons of economy, as well as by reason of the fact that the mercuric salts are more toxic than the other antimicrobial agents so that for this reason it is preferred that the mercuric salt be present in the lesser amount.

For "killing concentrations" the optimum ratio is about 10–60 parts of the phenolic or other antimicrobial agent per each part of the mercuric salt. As indicated, other proportions can be used with synergistic effect, the proportions given being most preferred.

Description of preferred embodiments

The following examples are given to illustrate compositions in accordance with the present invention. The scope of the invention is not, however, meant to be limited to the specific details of the examples:

EXAMPLE 1.—ANTISEPTIC SOLUTION

| | | |
|---|---|---|
| Bithionol | gm | 0.2 |
| Phenylmercuric acetate | gm | 0.02 |
| Ethyl alcohol | ml | 25.0 |
| Distilled water, q.s. | ml | 100 |

Procedure: Dissolve the bithionol and the phenylmercuric acetate in the alcohol and add sufficient water to make 100 ml.

EXAMPLE 2.—ANTISEPTIC TINCTURE

| | | |
|---|---|---|
| Hexachlorophene | gm | 0.6 |
| Phenylmercuric nitrate | gm | 0.02 |
| Ethyl alcohol | ml | 50.0 |
| Distilled water, q.s. to 100.0 ml. | | |

EXAMPLE 3.—SHAMPOO

Part 1

| | | |
|---|---|---|
| 12% sodium lauryl sulfate | ml | 400,000 |
| 5% lauric diethanolamide—Hyonic LA-90 | gm | 50,000 |
| 1% polyethylene glycol "600" distearate | gm | 10,000 |
| 2% polyoxyethylene lanolines—Lanogel 41 | gm | 20,000 |

Part 2

Water, deionized, q.s. to 950 liters.

| | | |
|---|---|---|
| 2% disodium 2,2′ - thiobis(4,6 - dichlorophenoxide)=Sodium bithionolate vacide BN 92% | gm | 21,740 |
| Citric acid, U.S.P. | gm | 5,000 |

Part 3

| | | |
|---|---|---|
| 0.05% chloromethoxypropylmercuric acetate=20% Quicksan–C20 | ml | 250 |

Part 4

| | | |
|---|---|---|
| 0.3% perfume oil | ml | 3,000 |

Part 5

Water deionized, q.s. to 1000 liters.

Procedure: Place together ingredients in Part 1 in a stainless steel kettle and warm sufficiently to make a clear solution (160° F.).

Add and dissolve ingredients in Part 2 in order.

Adjust pH to 7.0–7.3 using citric acid or sodium hydroxide, if necessary.

Add the Quicksan–C20—(20% solution) mixed in 4000 ml.

Allow to stand overnight to dissipate foam.

Add and blend the perfume—filter through Ertel #1 asbestos pads and add Part 5 through the filter.

Without further analysis, the foregoing will so fully reveal the gist of the present invention that others can, by applying knowledge available to those skilled in the art, modify the invention without, however, departing from the inventive concept. Such modifications are meant to be comprehended within the scope of the appended claims.

What is claimed is:

1. An antimicrobial composition comprising, as coactive ingredients, an antimicrobial organic mercuric salt selected from the group consisting of phenylmercuric and chloromethoxypropylmercuric acetate, nitrate and borate, and nitromersol, and an antimicrobial agent selected from the group consisting of bithionol, hexachlorophene, resorcinol, dichlorophene, parachlorometacresol, 4-N-hexylresorcinol, 3,4,4′-trichlorocarbanilide, a mixture of 20% 5,4′-dibromosalicylanilide and 80% 3,5,4′-tribromosalicylanilide, and a mixture of 20% 5,4′-difluorosalicylanilide and 80% 3,5,4′-trifluorosalicylanilide in a ratio of about 2–100 parts of said antimicrobial agent per each part of said organic mercuric salt.

2. Composition according to claim 1 wherein said antimicrobial agent is hexachlorophene and said organic mercury salt is phenylmercuric acetate.

3. Composition according to claim 1 wherein said antimicrobial agent is hexachlorophene and said organic mercury salt is phenylmercuric nitrate.

4. Composition according to claim 1 wherein said antimicrobial agent is hexachlorophene and said organic mercury salt is chloromethoxypropylmercuric acetate.

5. Composition according to claim 1 wherein said antimicrobial agent is bithionol and said organic mercury salt is phenylmercuric nitrate.

References Cited

UNITED STATES PATENTS

| | | | |
|---|---|---|---|
| 2,420,099 | 5/1947 | Salle et al. | 167—31 |
| 2,637,677 | 5/1953 | Dinerstein | 167—30 |
| 3,108,036 | 10/1963 | Molnar | 167—22 |

FOREIGN PATENTS

| | | |
|---|---|---|
| 484,228 | 5/1938 | England. |

OTHER REFERENCES

Chemical Abstracts, vol. 18, 1924, pp. 1149–1150.

Applied Microbiology, vol. 8, No. 1, January 1960, pp. 1–4.

Pesticide Index, Frear, College Science Publishers, State College, Pa., 1961, p. 45.

Antiseptics, Disinfectants, Fungicides and Chemical and Physical Sterilization, Lea & Febiger, Philadelphia, 1954.

ALBERT T. MEYERS, Primary Examiner

F. E. WADDELL, Assistant Examiner

U.S. Cl. X.R.

424—185, 230, 234, 235, 245, 322, 324, 337, 340, 347, 353